(12) United States Patent
Booij et al.

(10) Patent No.: US 10,156,438 B2
(45) Date of Patent: Dec. 18, 2018

(54) UNDERWATER LASER BASED MODELING DEVICE

(71) Applicant: FUGRO N.V., Leidschendam (NL)

(72) Inventors: Olaf Booij, Leiden (NL); Evert Schippers, Leimuiden (NL); Hendrik Wouters, The Hague (NL); Fatemeh Karimi Nejadasl, Delft (NL); Pawel Michalak, Voorburg (NL)

(73) Assignee: Fugro N.V. (NL)

( * ) Notice: Subject to any disclaimer, the term of this patent is extended or adjusted under 35 U.S.C. 154(b) by 136 days.

(21) Appl. No.: 15/503,688

(22) PCT Filed: Aug. 17, 2015

(86) PCT No.: PCT/EP2015/068857
§ 371 (c)(1),
(2) Date: Feb. 13, 2017

(87) PCT Pub. No.: WO2016/024026
PCT Pub. Date: Feb. 18, 2016

(65) Prior Publication Data
US 2017/0276479 A1 Sep. 28, 2017

Related U.S. Application Data

(60) Provisional application No. 62/037,951, filed on Aug. 15, 2014.

(51) Int. Cl.
*G01B 11/25* (2006.01)
*G01B 11/245* (2006.01)

(52) U.S. Cl.
CPC ........ *G01B 11/2545* (2013.01); *G01B 11/245* (2013.01); *G01B 2210/52* (2013.01)

(58) Field of Classification Search
CPC .................................................. G01B 11/2545
(Continued)

(56) References Cited

U.S. PATENT DOCUMENTS 4,777,501 A * 10/1988 Caimi ...................... G02B 7/32
396/107
7,030,616 B1* 4/2006 Boland, II ................ H01S 5/50
324/329

(Continued)

FOREIGN PATENT DOCUMENTS

EP 1630519 A1 3/2006
EP 1729116 A1 12/2006

(Continued)

OTHER PUBLICATIONS

English Abstract for FR2735860; retrieved Feb. 13, 2017 from www.espacenet.com.

(Continued)

*Primary Examiner* — Tarifur Chowdhury
*Assistant Examiner* — Omar Nixon
(74) *Attorney, Agent, or Firm* — Polsinelli PC

(57) ABSTRACT

An image acquisition unit for obtaining data to generate at least one three-dimensional representation of at least one underwater structure is disclosed. The image acquisition unit includes a unit body, a plurality of cameras, a first laser light device, and a second laser light device. The first laser light device can operate based on a first illumination setting. The second laser light device can operate based a second illumination setting. The first and second cameras can be configured to capture light during the first illumination setting and generate a first set of data representative of the first laser projecting on the at least one underwater structure at a predetermined scan rate. The third and fourth cameras can be configured to capture light during the second illumi- (Continued)

nation setting and generate a second set of data representative of the second laser projecting on the at least one underwater structure at the predetermined scan rate.

28 Claims, 10 Drawing Sheets

(58) Field of Classification Search
USPC .......................................................... 356/611
See application file for complete search history.

(56) References Cited

U.S. PATENT DOCUMENTS

| | | | |
|---|---|---|---|
| 7,839,082 B2* | 11/2010 | Ahn | H01L 27/3253 |
| | | | 313/292 |
| 2011/0292205 A1* | 12/2011 | Yuguchi | G01B 11/002 |
| | | | 348/142 |
| 2014/0009748 A1* | 1/2014 | Leonessa | G01C 3/08 |
| | | | 356/4.03 |

FOREIGN PATENT DOCUMENTS

| | | |
|---|---|---|
| FR | 2735860 A1 | 12/1996 |
| WO | 2010094135 A1 | 8/2010 |
| WO | 2016024026 A1 | 2/2016 |

OTHER PUBLICATIONS

English Abstract for EP1630519; retrieved Feb. 13, 2017 from www.espacenet.com.
International Search Report and Written Opinion dated Oct. 23, 2015 for corresponding PCT Application No. PCT/EP2015/068857.

* cited by examiner

UNDERWATER LASER BASED MODELING DEVICE

CROSS-REFERENCE TO RELATED APPLICATION

This application claims priority benefit of U.S. Provisional Application No. 62/037,951 filed Aug. 15, 2015, the contents of which are entirely incorporated by reference herein.

FIELD

The subject matter herein generally relates to underwater modeling devices.

BACKGROUND

Underwater surveying can be performed to examine and inspect many different types of underwater marine systems and/or structures. In performing the surveying, a remotely operated vehicle can be deployed. The remotely operated vehicle typically uses cameras mounted thereto to relay visual data back to a vessel on or near the surface of the water. An operator onboard the vessel examines the visual data to determine the state of the underwater marine system and/or structure.

BRIEF DESCRIPTION OF THE DRAWINGS

Implementations of the present technology will now be described, by way of example only, with reference to the attached figures, wherein.

DETAILED DESCRIPTION

Figure 1:
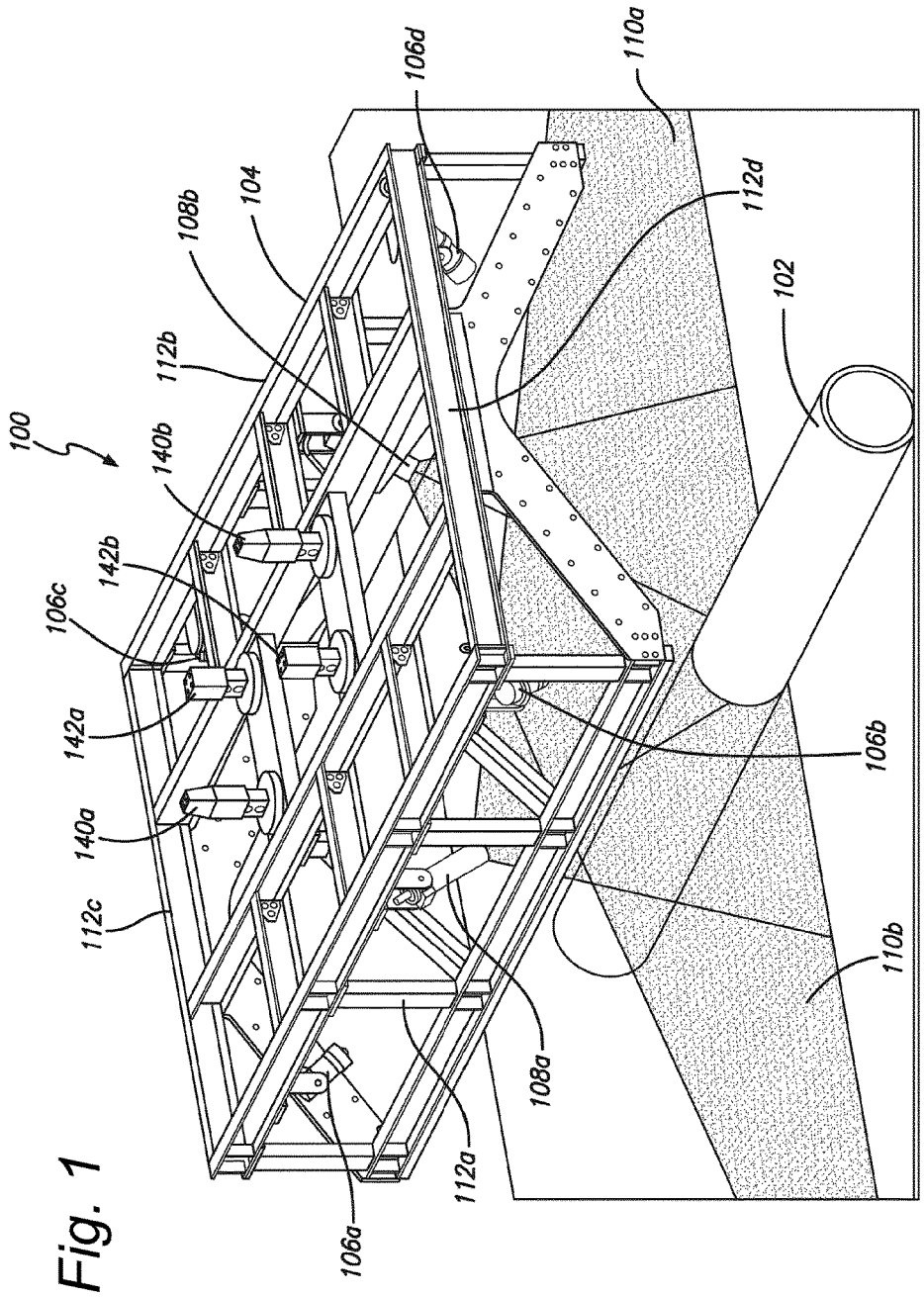
FIG. 1 is an isometric view of an example image acquisition unit according to the present disclosure illustrating a field of view of the camera and laser arrangement.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "point cloud" means a set of points in an X, Y, and Z coordinate system. The X, Y, and Z coordinate system can be oriented in a variety of different ways.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The present disclosure is described in relation to an underwater laser based image acquisition device configured to acquire image data relating to a marine structure. The present disclosure also relates to processing of acquired image data to construct a three dimensional (3-D) model of a structure in question. This processing can find application in modeling of underwater pipelines, underwater flying leads, mooring chains, and other underwater structures. In the particular application of underwater pipelines, a representative 3-D model of an underwater pipeline is generated. The present disclosure illustrates the 3-D model in relation to a pipeline, but the principles and implementations described herein can be utilized with reference to any underwater structure. In examining an underwater structure, the present disclosure can provide data regarding relative position. Additionally, the present disclosure can also include one or more detection devices configured to detect position data pertaining to the underwater structure in relation to one or more cameras, thereby providing absolute position of the structure.

The use of laser scanning technology can be used to create models of underwater objects. In particular, in the field of subsea pipeline inspection, it is desirable to obtain an accurate survey of underwater pipes. However, previous solutions made underwater surveys difficult due to limiting technology used. The methods and implementations set forth in the present disclosure enable generation of a detailed 3-D model of an underwater structure using computer vision techniques and thus it is not dependent on inaccurate modeling of the sound propagation in the water column.

The present disclosure is directed to such an underwater laser scanning modeling device. In particular, aspects of this disclosure pertain to an image acquisition unit for obtaining data to generate at least one 3-D representation of at least one underwater structure. The image acquisition unit can include a unit body with two or more cameras mounted to the unit body. Although discussions herein are generally directed to a unit body 104 like that illustrated in FIG. 1, it will be understood that a unit body can take other forms, such as a remotely operated vehicle or autonomous underwater vehicle, for example. In at least one embodiment, the two or more cameras can be four cameras mounted to the unit body. The implementation of four cameras allows using different photogrammetric algorithms which in many instances provide more accurate data, better quality control, and redundancy. In at least one embodiment within this disclosure, such photogrammetric algorithms can be implemented with two cameras. Additionally, such photogrammetric algorithms can be implemented with other numbers of cameras, within this disclosure. The image acquisition unit can also include a first laser light device having a first illumination setting. In at least one embodiment, the image acquisition unit can also include a second laser light device having a second illumination setting. The first laser light device and the second laser light device can be fan laser light devices. A fan laser light device emits light that produces a line like beam on the underwater structure.

The present disclosure focuses on the use of four cameras and two lasers. In other embodiments, other implementations can be used. For example, two cameras can be implemented with two different lasers. Additionally, the number of cameras can be increased.

The present disclosure includes the first and second cameras being configured to capture light during a first illumination setting and generate a first set of data representative of the first laser projecting on the at least one underwater structure at a predetermined scan rate. Additionally, the third and fourth cameras can be configured to capture light during a second illumination setting and generate a second set of data representative of the second laser projecting on the at least one underwater structure at the predetermined scan rate. In the at least one embodiment, the first and second illumination settings are mutually exclusive and, furthermore, this illumination settings can be controlled by a triggering routine wherein such triggering routine establishes a relationship between the cameras and their corresponding laser device. For example, the first and second cameras correspond to a first laser and the triggering routine establishes that when the laser emits light the set of cameras corresponding to that first laser are to capture light.

The first illumination setting can be having the first laser being activated. The second illumination setting can be having the second laser being activated. In at least one embodiment within this disclosure, this configuration can be a default configuration. In other embodiments, an illumination setting in which both lasers are activated can be implemented. In at least one embodiment within this disclosure, lasers/laser light devices described herein can be controlled by a stroboscopic triggering routine which, in conjunction with routines driving the cameras, enable the cameras to capture regular images in between the laser striping processes described herein.

The first and second cameras can mounted at opposite ends of a first side of the unit body. The third and fourth cameras can mounted at opposite ends of a second side of the unit body. The first laser can mounted between the first and second cameras on the first side of the unit body. When included, the second laser can mounted between the third and fourth cameras on the second side of the unit body. The middle mounting position provides for the laser to be located between the cameras so that a stereo view of the laser can be achieved thereby providing both a shape and dimensional measurement.

In at least one embodiment, the first and third cameras are mounted at opposite ends of a rear side of the unit body, and the second and fourth cameras are mounted at opposite ends of a front side of the unit body. Additionally, the first laser can be mounted between the first and second cameras on a right side of the unit body and the second laser can be mounted between the third and fourth cameras on a left side of the unit body.

The image acquisition unit can determine a position of the image acquisition unit in real-time, in which there is little or no latency in the system which determines the position of the image acquisition unit. In at least one embodiment, the unit body is coupled to or consists of a Remotely Operated Vehicle (ROV).

In at least one embodiment, the image acquisition unit further includes a control unit configured to trigger the first laser at a first predetermined interval corresponding to the first illumination setting. The control unit can be configured to further trigger the second laser, when equipped, at a second predetermined interval corresponding to the second illumination setting. In at least one embodiment, the second predetermined interval does not overlap with the first predetermined interval. The control unit can generate a source trigger for determining the first predetermined interval and the second predetermined interval. In at least one embodiment, the source trigger can be a square wave.

Also disclosed is a system for generating at least one three-dimensional representation of at least one underwater structure, the system can include an image acquisition unit comprising a unit body, a first camera, a second camera, a third camera, and a fourth camera. The first camera, second camera, third camera and the fourth camera, each being mounted to the unit body. Additionally, the image acquisition can include a first laser light fan device having a first illumination setting and a second laser light fan device having a second illumination setting. The first and second cameras can be configured to capture light during the first illumination setting and generate a first set of data representative of the first laser projecting on the at least one underwater structure at a predetermined scan rate. The third and fourth cameras can be configured to capture light during the second illumination setting and generate a second set of data representative of the second laser projecting on the at least one underwater structure at the predetermined scan rate. A control unit can be configured to trigger the first laser at a first predetermined interval corresponding to the first illumination setting and further trigger the second laser at a second predetermined interval corresponding to the second illumination setting. A processing unit can be configured to receive the data from the four cameras and be configured to detect the at least one underwater structure and reconstruct a profile of the at least one underwater structure. In at least one embodiment the processing unit is further configured to compile the first set of data and the second set of data into a composite set of data.

Also disclosed is a method is for generating at least one three-dimensional representation of at least one underwater structure comprising activating a first laser light device having a first illumination setting. The method can further include capturing light during the first illumination setting. The method can also include generating a first set of data representative of the first laser projecting on the at least one underwater structure at a predetermined scan rate. The method can include activating a second laser light fan device having a second illumination setting. Additionally, the method can include capturing light during the second illumination setting. In at least one embodiment, the method can include generating a second set of data representative of the second laser projecting on the at least one underwater structure at the predetermined scan rate. The first and second illumination settings can be mutually exclusive. The method can also include compiling the first set of data and the second set of data into a composite set of data.

Referring now to FIG. 1, an image acquisition unit 100 for obtaining data to generate at least one 3-D representation of at least one underwater structure 102 is shown. In at least one embodiment, the image acquisition unit 100 can be configured to be mounted to a remote operated vehicle (not shown). The image acquisition unit 100 can be directly coupled to the remotely operated vehicle. In other examples, the image acquisition unit 100 can be indirectly coupled to the remote operated vehicle for example through a tether or another type of suspension device.

The image acquisition unit 100 as illustrated includes a unit body 104. The unit body can be coupled to four cameras (106a-d). The image acquisition unit 100 includes a plurality of connectors 140a, 140b, 142a, 142b that are configured to couple to data transfer cables, power cables or other type of electrical connectors. As illustrated, the plurality of connectors 140a, 140b, 142a, 142b includes two different types of connectors. A first type of connector 140a, 140b has an end that is shaped like a pyramid. A second type of connector 142a, 142b has an end that is substantially cubic. In at least one embodiment, the different types of connectors can correspond to one of the lasers or a pair of cameras. For example, the first type of connectors 140a, 140b can correspond to individual lasers, namely a first laser light device 108 and a second laser light device 108b. Additionally, the second type of connector 142a, 142b can correspond to a first pair of cameras, namely a first camera 106a and a second camera 106b, and a second pair of cameras, namely a third camera 106c and a fourth camera 106d. In at least one embodiment within this disclosure, a camera control unit (CCU) can be implemented. Systems described herein can be configured such that all cables from cameras and lasers described herein are coupled to the CCU. The CCU can activate and supply power to the lasers and cameras. In at least one embodiment within this disclosure, the CCU can require only an Ethernet connection, a trigger line, and a power coupling with an ROV to be functional.

A first laser light device 108a can have a first illumination setting 110a. The first 106a and second 106b cameras can be configured to capture laser light during the first illumination setting 110a and generate a first set of data 400 representative of the first laser 108a projecting on the at least one underwater structure 102 at a predetermined scan rate. The first laser light device 108a can be a laser light fan device. A laser light fan device is a laser that is configured to project a line of laser light onto a surface. When the laser light device 108a is a laser light fan device, the laser light device 108a can be held stationary while the first camera 106a and the second camera 106b are configured to move relative to the unit body 104. The first camera 106a and the second camera 106b can each be mounted on a moveable device that allows for the first camera 106a and the second camera 106b to be independently controlled so that the field of view of the respective first camera 106a and second camera 106b can be adjusted based on the surface of interest. In other embodiments, the first camera 106a and the second camera 108b can be held stationary while the first laser light device 108a is configured to move. The use of either a moving laser or moving camera enables the field of view of the image acquisition device to be controlled to produce a desired image that can in turn be used to build a three-dimensional model.

The image acquisition device can also include a second laser light device 108b having a second illumination setting 110b. The third 106c and fourth 106d cameras can configured to capture light during the second illumination setting 110b and generate a second set of data 500 representative of the second laser 108b projecting on the at least one underwater structure 102 at the predetermined scan rate. The first illumination setting 110a and the second illumination setting 110b are illustrated as being done simultaneously. This illustration is for illustrative purposes only and the first illumination setting 110a and the second illumination setting 110b can be mutually independent from each other. When the first illumination setting 110a and the second illumination setting 110b are independent from one another, the data captured by the respective pair of cameras can be controlled to capture light image data from a single one of the first laser light device 108a or the second laser light device 108b.

The unit body 104 can be a rig or scaffolding for underwater use. For example, the material used to construct the unit body 104 can be one that is compatible with a saltwater environment. In at least one embodiment, the unit body 104 can be coated with a special coating providing for a desired resistance to the saltwater environment. In at least one embodiment, such as the one illustrated in FIG. 1, the unit body 104 comprises four sides, a first side 112a, a second side 112b, a third side 112c, and a fourth side 112d. As illustrated, the unit body 104 can be in the form of a truss or frame. In the illustrated embodiment, the unit body 104 is only illustrated as having the first camera 106a, the second camera 106b, the third camera 106c, the fourth camera 106d, a first laser light device 108a, and a second laser light device 108b coupled thereto. In other embodiments, additional components can be mounted to unit body 104. Also, as indicated above, the unit body 104 can be composed of or be coupled to a ROV. In at least one embodiment within this disclosure, the cameras 106a-d and lasers 108a-b can be mounted directly to the ROV, without other mounting members. The ROV can be autonomous or tethered. In other embodiments, the unit body 104 can be coupled to or composed of a fixed underwater structure 102. When the unit body 104 is fixed to an underwater structure 102, both the cameras 106a-d and laser light devices 108a-b can be configured to move independent from each other. In at least one embodiment, the unit body 104 can have a location fixing device affixed thereto. The location fixing device can be located at a given position on the unit body 104, thereby providing data regarding the location of the unit body. This data can be used in conjunction with the image data to calculate the location of the structure 102 in an acquired image.

The cameras 106a-d can be configured to include filters that are set to detect a particular wavelength of light that is expected to be reflected from the underwater structure 102 which typically corresponds with the color of the laser light that is emitted by the laser light device. When a filter is included, the cameras 106a-d can be configured to operate simultaneously and the laser light devices 108a-b can also be operated simultaneously. In this embodiment, the simultaneous operation of the cameras 106a-d and laser light devices 108a-b reduces the complexity in having the cameras 106a-d and laser light devices 108a-b synchronized. In other embodiments, the same color of laser light is desired due to optical properties of the water. For example, the lasers can be configured to emit a green light having a wave length substantially around 532 nm. In other embodiments, different color laser device can be implemented to provide a desired wavelength based on the optical properties of the water. In some embodiments, each of the laser light devices 108a-b can be configured to have multiple lasers associated therewith. For example, each laser light device 108a-b can include a green, blue and red laser. The emitted color of the laser can be emitted and the cameras 106a-b can be used to detect the light. The cameras 106a-b can all be activated to monitor the emission of the laser. Camera data can then be analyzed to determine which laser has the optimal reflective properties for a given water condition as well as a given structure. In at least one embodiment within this disclosure, laser light devices 108a-b can project one or more patterns composed of multiple lines. In these instances, when the patterns are visible to cameras 106a-b, a point cloud can be generated which is denser than when only a single line is projected onto the structure.

In at least one embodiment, the cameras are arranged such that at least two cameras are used to detect a distance of a point on the illuminated structure from each camera. The illumination of the structure can be by a fan type laser device that emits a line of laser or it can be a point type laser that is configured to move in a fixed fashion to illuminate the structure so that only a single point at a given time is illuminated. Triangulation is used to compute a distance of the point of structure from each camera. The distance is then used to determine a location of the structure relative to the camera to produce the 3-D image. The locations in 3-D space of the point of light are compiled together to generate a point cloud. In at least one embodiment there are two cameras for each laser, such that the two cameras are used exclusively to detect the distance from a point of light emitted from the laser.

For example, in the embodiment of the invention shown in FIG. 1, first and second cameras 106a and 106b are used to detect the distance from a point of light emitted from the first laser 108a, and third and fourth cameras 106c and 106d are used to detect the distance from a point of light emitted from the second laser 108b.

The first illumination setting (illustrated by 110a) is created using the first laser light device 108a. As described above, the first laser light device 108a can emit light in the form of a line or as a point that is moved to create a series of points along a line. Essentially, this can be described as creating a light stripe on the structure. The laser light reflected is sensed by the first camera 106a and the second camera 106b.

A second illumination setting (illustrated by 110b) is created using the second laser light device 108b. As described above, the second laser light device 108b can emit light in the form of a line or as a point that is moved to create a series of points along a line. Essentially, this can be described as creating a light stripe on the structure 102. The laser light reflected is sensed by the third camera 106c and the fourth camera 106d.

Figure 2:
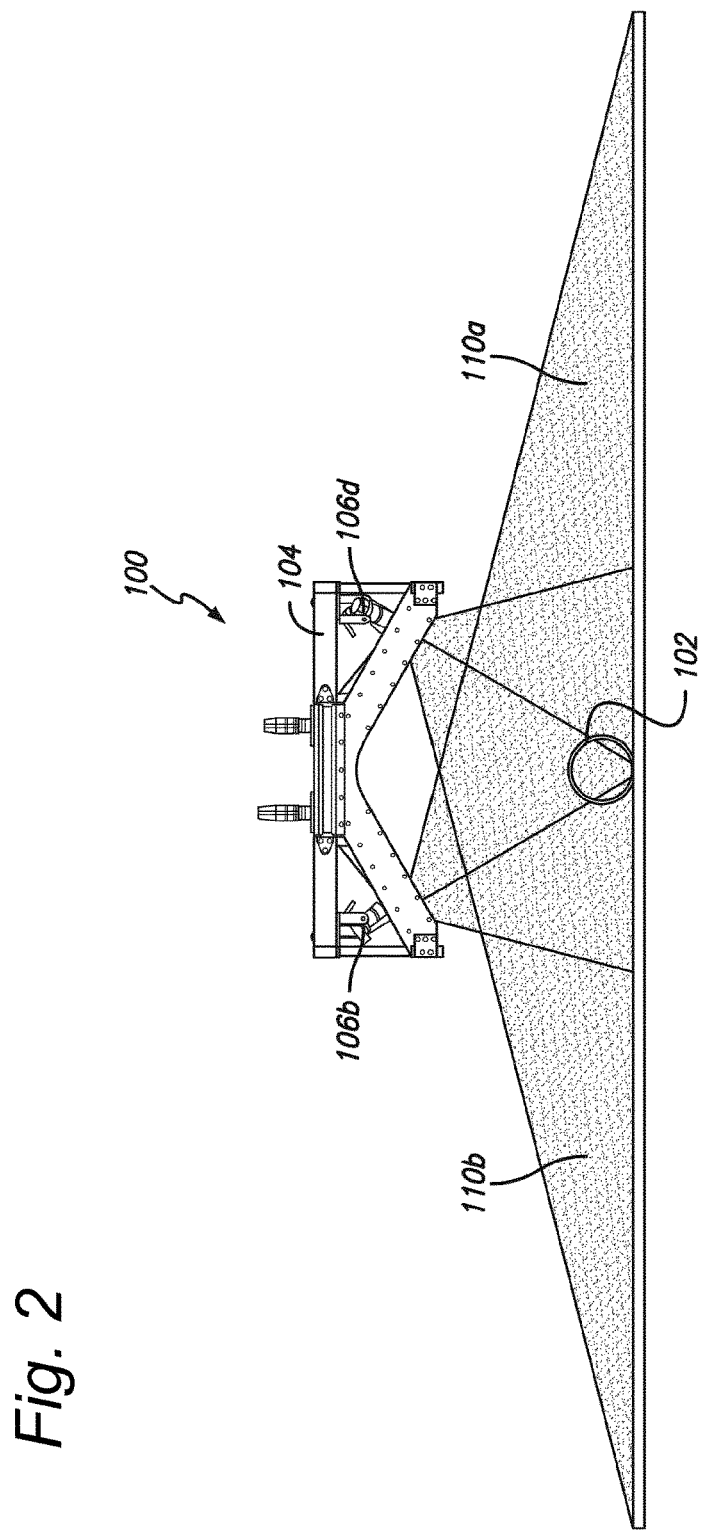
FIG. 2 is a front elevational view of the image acquisition unit of FIG. 1.

FIG. 2 illustrates a front elevational view of the image acquisition unit 100. Cameras 106b and 106d from FIG. 1 are visible. As shown, the first laser light device, (obscured), and the second laser light device, (also obscured), are mounted to unit body 104. The first and second laser light devices can be configured to emit light in substantially the same plane. In other embodiments, the first laser light device and the second laser light device can be configured to emit light in different planes at a fixed offset. When the same plane is used, it is important to time the spacing of the emission of the light to be close in proximity. For example, the emission of the light and acquisition of the image can be done in 1 millisecond intervals. This spacing allows substantially the same structure 102 to be recorded using the first illumination setting 110a and the second illumination setting 110b.

Figure 3:
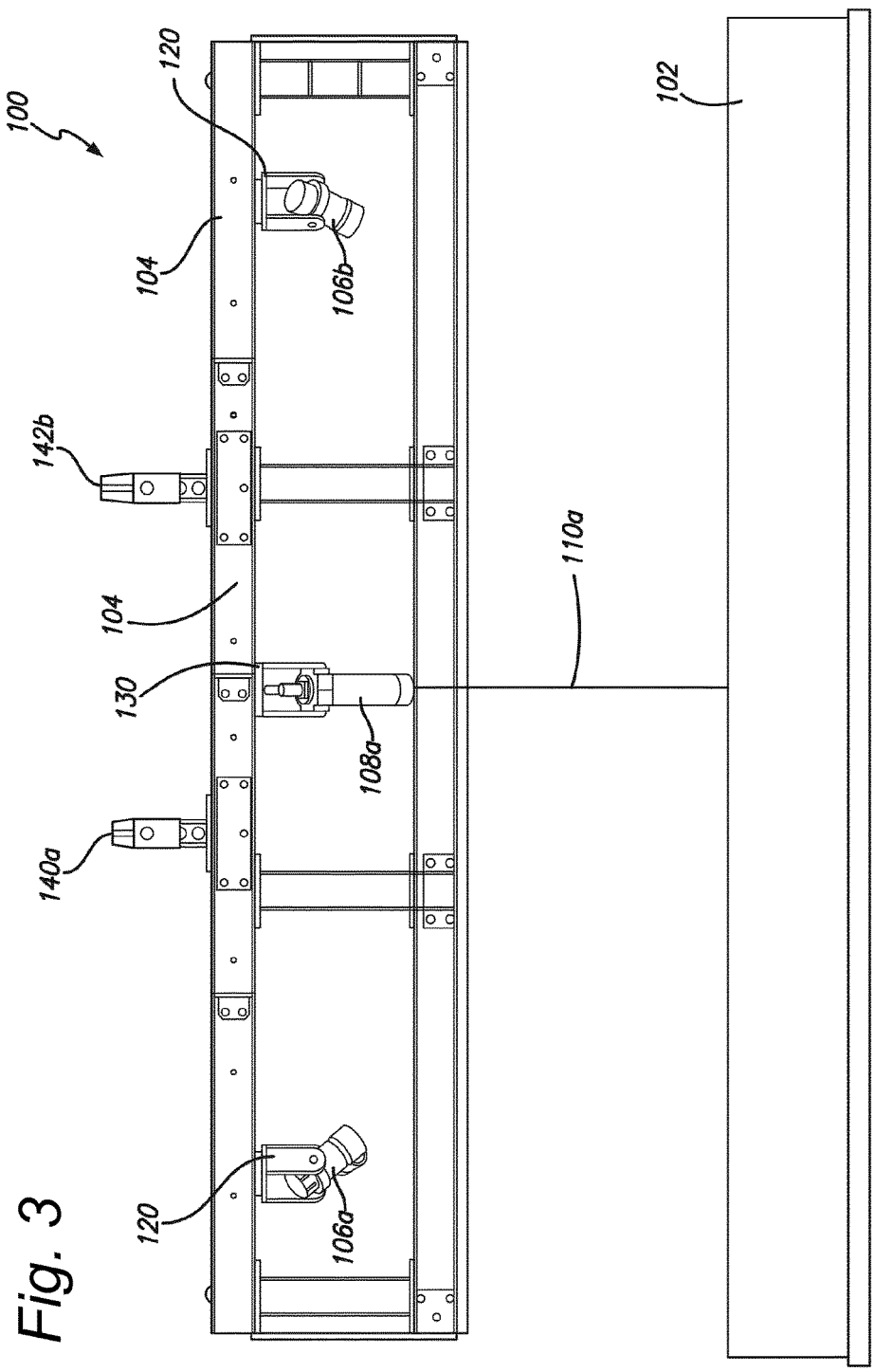
FIG. 3 is a side elevational view of the image acquisition unit of FIG. 1.

FIG. 3 further illustrates the alignment of the cameras 106a-d and the laser light devices 108a-b. As illustrated, only the right side of the image acquisition unit 100 is illustrated. As illustrated the first camera 106a and the second camera 106b are mounted on the right side of the image acquisition unit 100. Additionally, the first laser light device 108a is mounted on the right side of the device. Each of the first camera 106a and the second camera 106b are illustrated as being coupled to the unit body 104 by moveable mounts 120. The moveable mounts 120 enable the respective camera 106a, 106b to be moved into a desired position so that it is possible to obtain a desired field of view. In the illustrated embodiment of FIG. 3, the first laser light device 108a can be mounted on a laser positioning device 130. The laser positioning device 130 is configured to control the location of the laser light device 108a so that the laser light device 108a emits light as required for the image acquisition.

As illustrated in FIG. 3, the first laser light device 108a emits light based on a first illumination setting 110a. The first illumination setting 110a allows light to be reflected off of the underwater structure 102. The first laser light device 108a can be controlled through the first type of connector 140a. The data acquired by first camera 106a and the second camera 106b can be transmitted by a second type of connector which is not illustrated, but would be similar to the illustrated 142b, which corresponds to the third camera and the fourth camera. The data can be transmitted by an umbilical or other device including a wireless device to either the remotely operated vehicle or control unit at the surface. As discussed above, in at least one embodiment within this disclosure, implementations of the technology can include a CCU connected to the cables from the cameras and the laser lights. The CCU can trigger and power the lasers and cameras. The CCU can be configured such that it requires only an Ethernet connection, a trigger line, and a power connection from an ROV. It will be understood that while FIG. 3 illustrates the first camera 106a, the second camera 106b, and the first laser light device 108a; the third camera 106c, the fourth camera 106d, and the second laser light device 108b can be configured in a mirrored fashion.

Figure 4:
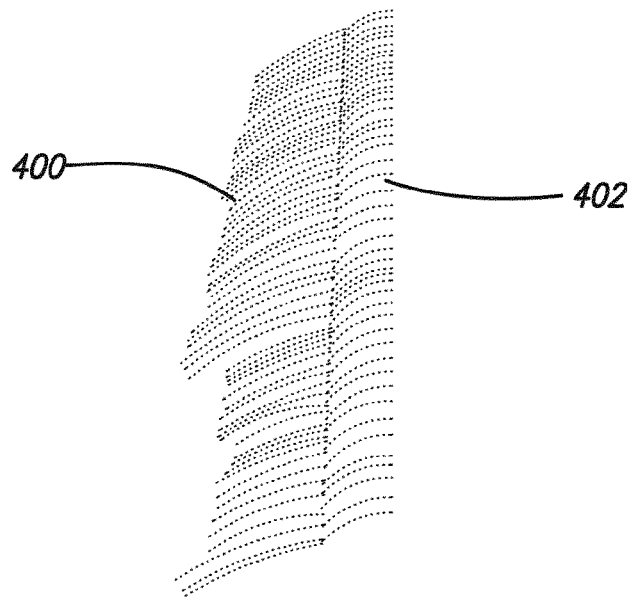
FIG. 4 illustrates a perspective view of a first point cloud generated from a first set of data representative of a first laser projecting on at least one underwater structure at a predetermined scan rate.

In at least one embodiment within this disclosure, the laser light devices can be movable and/or translatable to different positions or configurations, or both. In at least one embodiment, the positions of the cameras can be adjustably fixed. FIG. 4 illustrates a first set of data 400 that generates a first 3-D point cloud 402. The first point cloud 402 is produced from data 400 that is collected from the first camera 106a and the second camera 106b. The present disclosure also includes acquiring individual locations of the points illustrated in the first point cloud 402. This data can be derived using triangulation. Using the case of an underwater pipe as an example, the laser will not project over the side opposite to the laser due to a structure essentially shading that portion. As a result, the first point cloud 402 generated is substantially half complete, as shown in FIG. 4.

Figure 5:
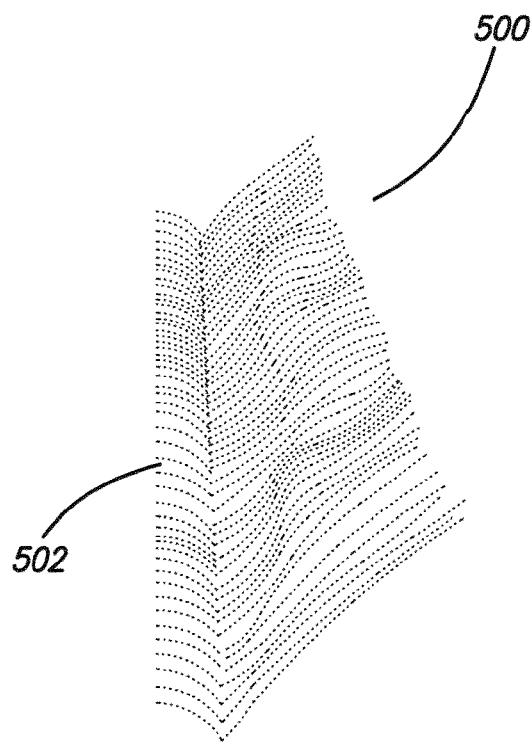
FIG. 5 illustrates a perspective view of a second point cloud generated from a second set of data representative of a second laser projecting on the at least one underwater structure at the predetermined scan rate.
Figure 6:
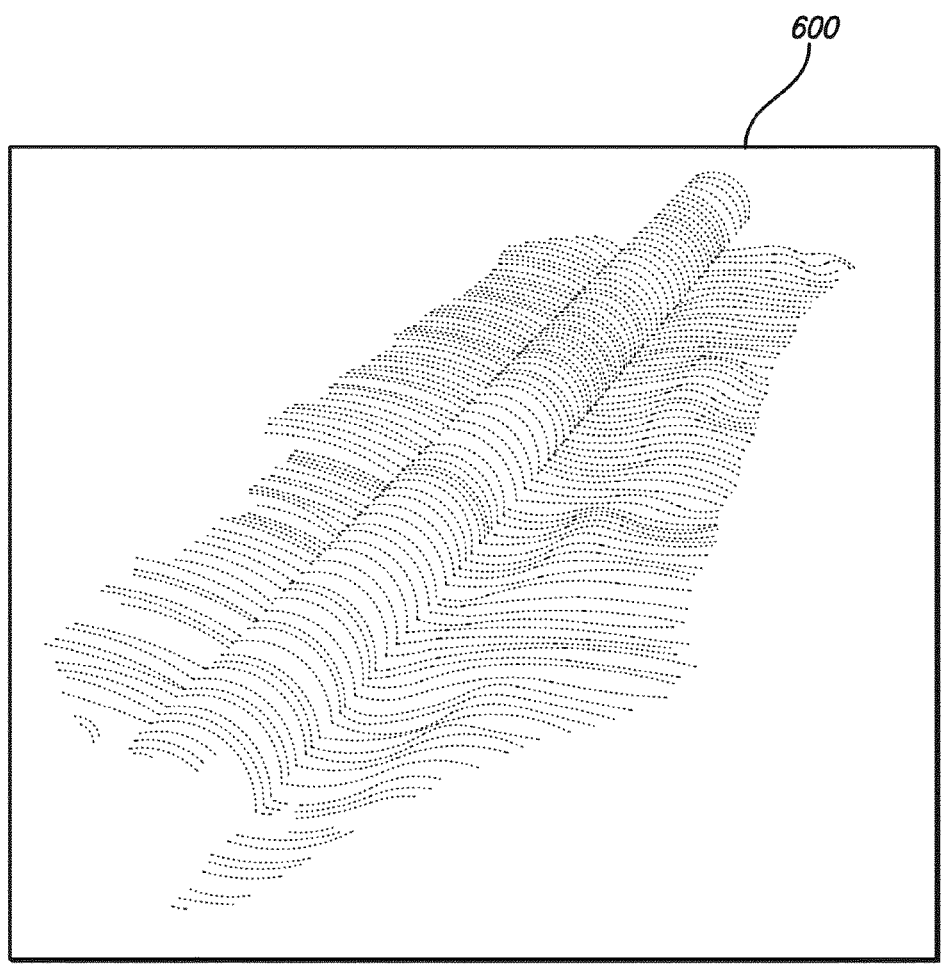
FIG. 6 illustrates a perspective view of a composite point model created by compiling the first set of data and the second set of data.

To generate a point cloud for the other half of the underwater structure 102, the second illumination setting 110b and second laser 108b are used to generate a second set of data 500. Similar to before, the second illumination setting 110b is created by the second laser 108b, which causes the projection of a stripe across the other side of the underwater structure 102. The third and fourth cameras 106c and 106d detect the distance of the light projected onto the underwater structure and triangulate the distances to create a second 3-D point cloud 502, illustrated in FIG. 5, from the second set of data 500. A processing unit (not shown) processes the first and second sets of data 400 and 500 and creates a 3-D model 600, illustrated in FIG. 6, of the underwater structure 102. Details regarding the processing unit and how the 3-D model is generated will be discussed in greater detail below.

The predetermined scan rate can be any value known in the art used for data sampling purposes. Preferably the predetermined scan rate is 10 Hz. The higher the scan rate, the more detailed the 3-D model will be. Preferably the data is sampled at 100 millisecond intervals to avoid overloading the system with too much data to process. The predetermined scan rate can be varied to suit the requirements of a particular situation.

In at least one embodiment, the first and second cameras are mounted at opposite ends of a first side of the unit body, and the third and fourth cameras are mounted at opposite ends of a second side of the unit body, wherein the first laser 108a is mounted between the first 106a and second 106b cameras on the first side 112a of the unit body 104 and the second laser 108b is mounted between the third 106c and fourth 106d cameras on the second side 112b of the unit body 104.

In at least one embodiment the first 106a and third 106c cameras are mounted at opposite ends of a first side 112a of the unit body, and the second 106b and fourth 106d cameras are mounted at opposite ends of a second side 112b of the unit body 104, wherein the first laser 108a is mounted between the first 106a and second 106b cameras on a third side 112c of the unit body and the second laser is mounted between the third and fourth cameras on a fourth side 112d of the unit body 104 (not shown).

Additionally, the image acquisition unit 100 can determine a position of the image acquisition unit 100 in real-time. Determination of the position in real-time can be accomplished by methods known in the art.

In at least one embodiment, the unit body 104 is coupled to or consist of a Remotely Operated Vehicle (ROV). The ROV can be an underwater device including, but not limited to, an autonomous underwater vehicle (AUV), towed sled, and the like. The ROV can be manually controlled by a user, or automatically piloted. In at least one embodiment the image acquisition unit 100 is mounted beneath or on the front of the ROV.

In at least one embodiment, the image acquisition unit 100 further comprises a control unit (not shown) configured to trigger the first laser 108a at a first predetermined interval corresponding to the first illumination setting 110a and further trigger the second laser 108b at a second predetermined interval corresponding to the second illumination setting 110b that does not overlap with the first predetermined interval.

The control unit can be any computing device known in the art, including, but not limited to, desktop computers, laptop computers, tablet computers, and the like.

The first and second illumination settings 110a and 110b can be mutually exclusive such that while the first illumination setting 110a is active, the second illumination setting 110b is inactive, and vice versa. The control unit can generate a source trigger for determining the first predetermined interval and second predetermined interval. In at least one embodiment the source trigger comprises a square wave signal such that the first laser 108a and first and second cameras 106a and 106b are active during the maximum value of the square wave signal, and the second laser 108b and third and fourth cameras 106c and 106d are active during the minimum value of the square wave signal, or triggered by a rising or falling edge of the signal.

In at least one embodiment, an in-water calibration and alignment is conducted prior to operation of the image acquisition unit 100, where the lasers 108a and 108b are rigidly attached to the unit body 104. In the event a camera becomes disabled, the image acquisition unit 100 can still continue to operate with only a small degradation in accuracy until it is possible to replace the disabled camera and re-calibrate in-water. Alternatively, in the event of a misaligned laser, software installed on a processing unit is used to fix any errors without the need for re-aligning the laser or repeating the in-water calibration. In at least one embodiment, the image acquisition unit is positioned to operate between 0.5 and five meters above the seabed.

Figure 7:
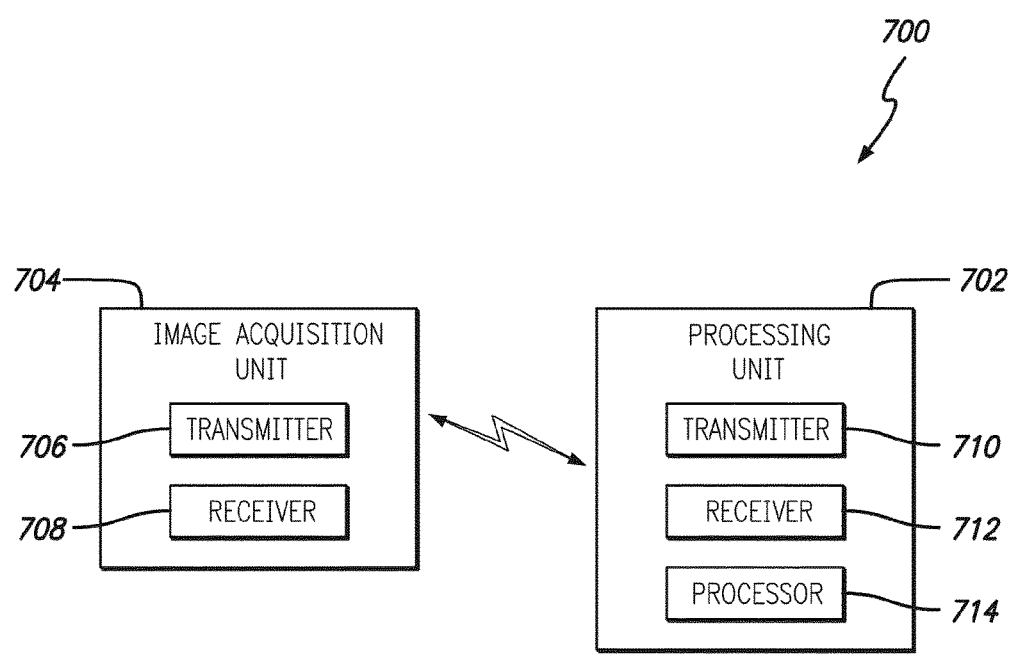
FIG. 7 illustrates a block diagram of a system configured to generate at least one three-dimensional representation of at least one underwater structure according to the present disclosure.

Referring now to FIG. 7, a system 700 for generating at least one three-dimensional representation of at least one underwater structure 102 is shown. The system comprises an image acquisition unit 100 for obtaining data and a processing unit 702.

The image acquisition unit 704 comprises a transmitter 706 and receiver 708. In some embodiments the transmitter and receiver can be combined into a transceiver.

The processing unit 702 comprises a transmitter 710, a receiver 712, and a processor 714, and is configured to receive the data 400 and 500 from the four cameras 106a-d. In some embodiments the transmitter and receiver can be combined into a transceiver. The processing unit 702 is further configured to detect the at least one underwater structure 102, and reconstruct a profile of the at least one underwater structure 102.

The processing unit 702 can be any computing device, including, but not limited to, desktop computers, laptop computers, tablet computers, and the like. The processing unit 702 functions according to methods for 3-D image processing in order to reconstruct the profile of the underwater structure.

In at least one embodiment, the processing unit 702 is further configured to compile the first set of data 400 and the second set of data 500 into a composite set of data. The composite set of data can be the 3-D model 600.

The image acquisition unit 100 is electronically coupled using either wired or wireless means commonly known in the art to the processing unit 702 such that the two are in electronic communication with each other. The processing unit 702 receives the first and second sets of data 400 and 500 from the four cameras 106a-d and reconstructs the profile of the underwater structure 102.

In at least one embodiment, the reconstructing is achieved by applying a platelet type approach to the first and second sets of data 400 and 500, by taking fragments from both the first and second point clouds 402 and 502 to assemble a patchwork of image pieces that gives the appearance of being a single homogeneous mosaic. In at least one embodiment the reconstructing is accomplished by software installed on the processing unit 702. In at least one embodiment, reconstructing can be performed by taking all scans from both sides of a structure in question and merging the point clouds derived therefrom. In this manner, data relating to a region of interest of a structure, such as the top of a pipe, can be retrieved from both sides of the structure, creating overlapping data, and enabling a point cloud to be generated which is twice as dense then would otherwise be the case.

In at least one embodiment, the software 702 is used to fix errors associated with a misaligned laser as described above.

Figure 8A:
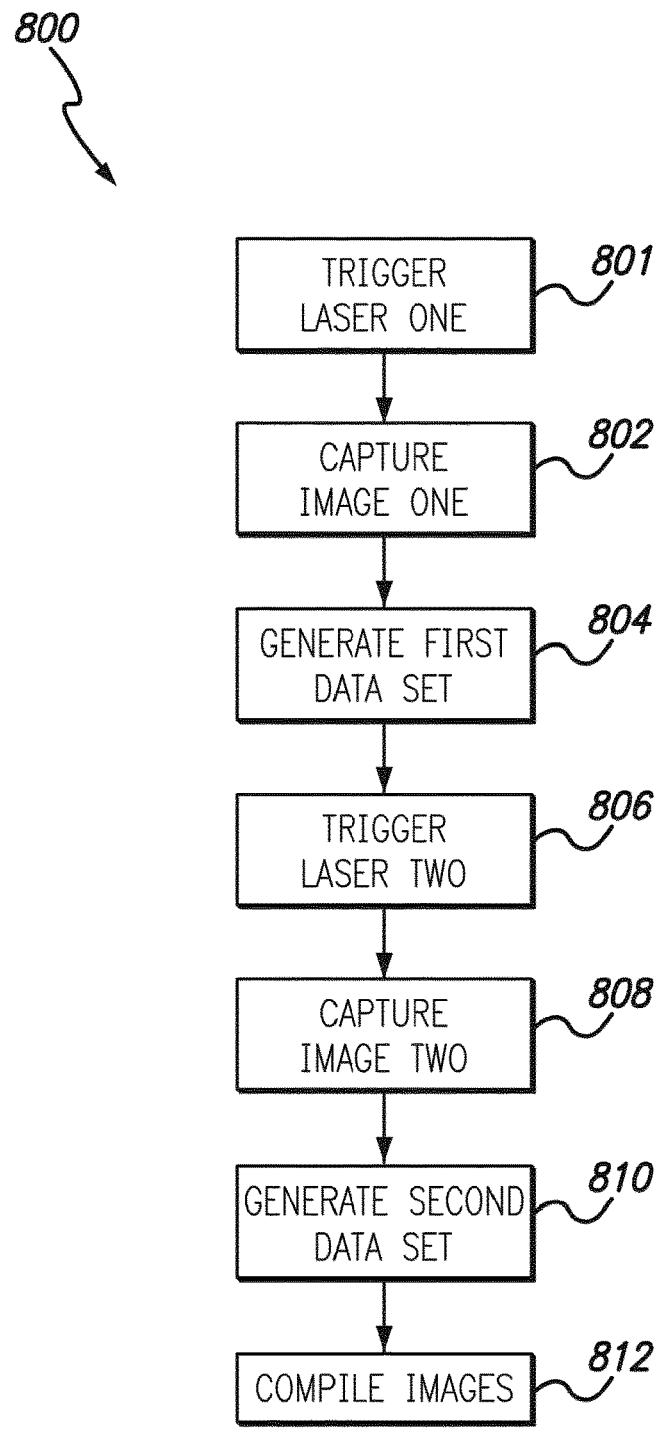
FIGS. 8A-B are flowcharts of example methods of generating at least one three-dimensional representation of at least one underwater structure according to the present disclosure.
Figure 8B:
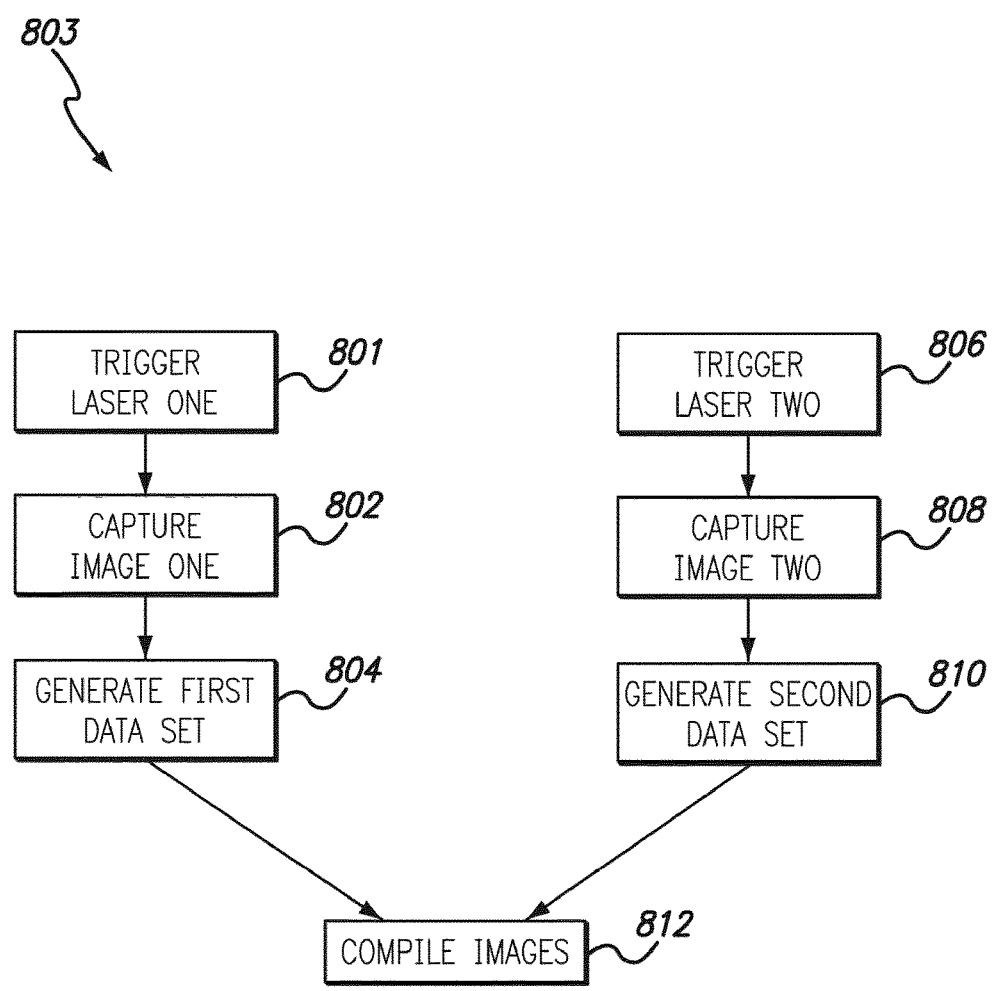

Referring now to FIG. 8A, a flowchart illustrating a method 800 for generating at least one three-dimensional representation of at least one underwater structure is shown. The method includes activating a first laser light fan device having a first illumination setting 801. The method further includes capturing light during the first illumination setting 802. Additionally, the method includes generating a first set of data representative of the first laser projecting on the at least one underwater structure at a predetermined scan rate 804. Still further the method includes activating a second laser light fan device having a second illumination setting 806. Further still, the method can include capturing light during the second illumination setting 808. The method can also include generating a second set of data representative of the second laser projecting on the at least one underwater structure at the predetermined scan rate, wherein the first and second illumination settings are mutually exclusive 810. The method can also include compiling the first set of data and the second set of data into a composite set of data 812. In FIG. 8B, a flowchart illustrating a method 803 for generating at least one three-dimensional representation of at least one underwater structure is shown. Method 803 is the same as method 800, except that steps 801 through 804, and steps 806 through 810, are respectively performed in parallel.

Figure 9A:
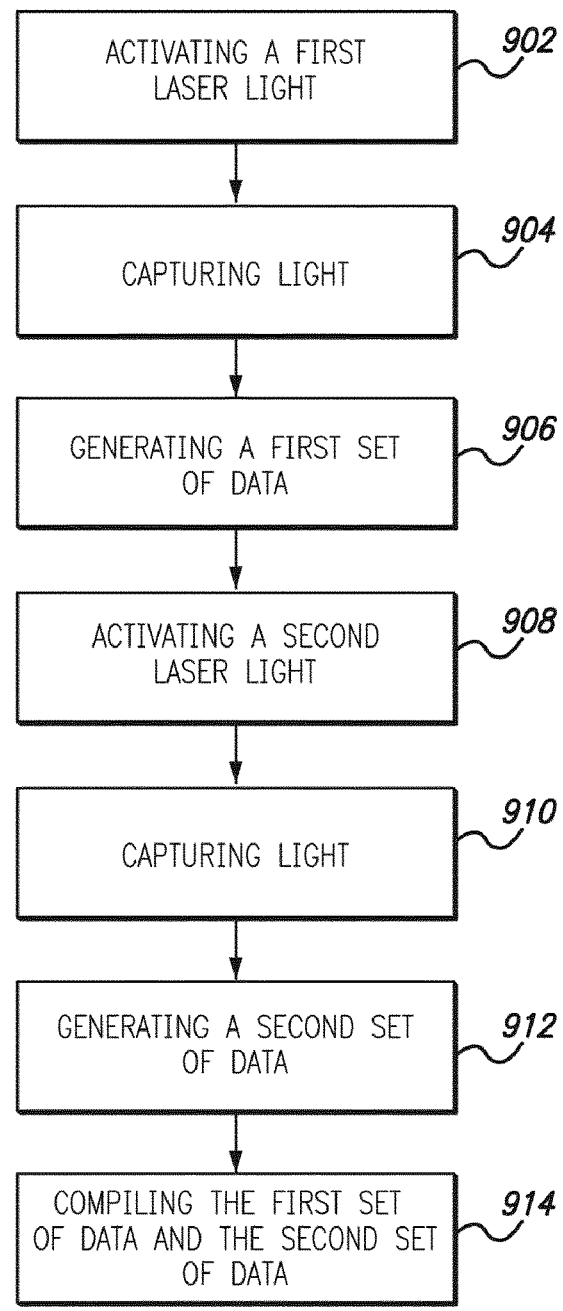
FIGS. 9A-B are additional flowcharts of example methods of generating at least one three-dimensional representation of at least one underwater structure according to the present disclosure.
Figure 9B:
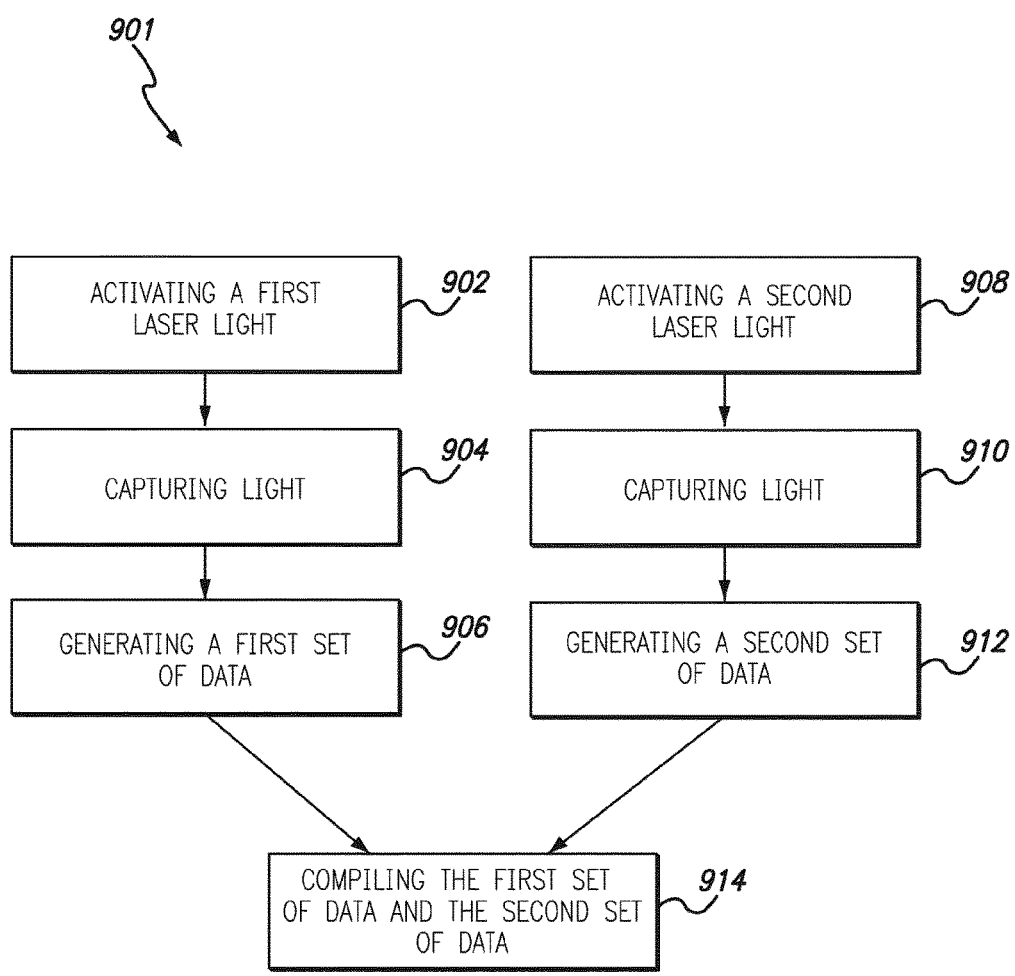

Referring now to FIG. 9A, a flowchart illustrating another method 900 for generating at least one three-dimensional representation of at least one underwater structure is shown. The method 900 includes activating a first laser light fan device having a first illumination setting 902. The method 900 further includes capturing light during the first illumination setting 904. Thereafter, the method 900 proceeds to 906, which includes generating a first set of data representative of the first laser projecting on the at least one underwater structure at a predetermined scan rate. The method 900 then proceeds to 908, which involves activating a second laser light fan device having a second illumination setting. Thereafter, the method 900 proceeds to 910, which involves capturing light during the second illumination setting. The method 900 can further include generating a second set of data representative of the second laser projecting on the at least one underwater structure at the predetermined scan rate 912, wherein the first and second illumination settings are mutually exclusive. Thereafter, the method 900 can proceed to compiling the first set of data and the second set of data into a composite set of data 914. In FIG. 9B, a flowchart illustrating a method 901 for generating at least one three-dimensional representation of at least one underwater structure is shown. Method 901 is the same as method 900, except that steps 902 through 906, and steps 908 through 912, are respectively performed in parallel.

The foregoing methods can be completed using the image acquisition unit and processing unit as described above. It will be recognized by those skilled in the art that the other arrangements of the steps of the methods described above are possible within this disclosure.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

The invention claimed is:

1. An image acquisition unit for obtaining data to generate at least one three-dimensional representation of at least one underwater structure, the image acquisition unit comprising:
a unit body; and
a first pair of cameras mounted to the unit body by a first moveable device configured to adjust the first pair of cameras based on the at least one underwater structure, the first pair of cameras having a first laser device corresponding thereto mounted to the unit body, the first laser device configurable to have at least a first illumination setting;
a second pair of cameras mounted to the unit body by a second moveable device configured to adjust the second pair of cameras based on the at least one underwater structure and independent from the first pair of cameras, the second pair of cameras having a second laser device corresponding thereto mounted to the unit body, the second laser device configurable to have at least a second illumination setting different from the first illumination setting;
wherein each camera from amongst the first and second pairs of cameras is configured to capture light emitted at a predetermined scan rate by the corresponding laser device and reflected by the at least one underwater structure, and generate a data set corresponding to the captured light.

2. The image acquisition unit of claim 1, wherein:
the first pair of cameras comprises a first camera and a second camera;
the second pair of cameras comprises a third camera and a fourth camera;
the first laser device corresponding to the first camera and the second camera comprises a first laser light fan device having the first illumination setting;
the second laser device corresponding to the third camera and the fourth camera comprises a second laser light fan device having the second illumination setting;
the first and second cameras are configured to capture light during the first illumination setting and generate a first set of data representative of the first laser projecting on the at least one underwater structure at the predetermined scan rate; and
the third and fourth cameras are configured to capture light during the second illumination setting and generate a second set of data representative of the second laser projecting on the at least one underwater structure at the predetermined scan rate.

3. The image acquisition unit of claim 2, wherein the first and second cameras are mounted at opposite ends of a first side of the unit body, and the third and fourth cameras are mounted at opposite ends of a second side of the unit body.

4. The image acquisition unit of claim 3, wherein the first laser device is mounted between the first and second cameras on the first side of the unit body and the second laser device is mounted between the third and fourth cameras on the second side of the unit body.

5. The image acquisition unit of claim 2, wherein the first and third cameras are mounted at opposite ends of a first side of the unit body, and the second and fourth cameras are mounted at opposite ends of a second side of the unit body.

6. The image acquisition unit of claim 5, wherein the first laser device is mounted between the first and second cameras on a third side of the unit body and the second laser device is mounted between the third and fourth cameras on a fourth side of the unit body.

7. The image acquisition unit of claim 1, wherein the first and second illumination settings are mutually exclusive.

8. The image acquisition unit of claim 1, wherein each pair of cameras and its corresponding laser device are configured to be moved relative one another by remote control of each moveable device.

9. The image acquisition unit of claims 1, wherein at least one pair of cameras comprises cameras which reside in a stereo vision arrangement.

10. The image acquisition unit of claim 1, wherein a position of the image acquisition unit is determined in real-time.

11. The image acquisition unit of claim 1, wherein the unit body is a remotely operated vehicle or autonomous underwater vehicle.

12. The image acquisition unit of claim 1, further comprising a control unit configured to trigger the first laser at a first predetermined interval corresponding to the first illumination setting and further trigger the second laser at a second predetermined interval corresponding to the second illumination setting.

13. The image acquisition unit of claim 12, wherein the control unit is configured such that the second predetermined interval does not overlap with the first predetermined interval.

14. The image acquisition unit of claim 12, wherein the control unit is configured to generate a source trigger for determining the first predetermined interval and the second predetermined interval.

15. The image acquisition unit of claim 14, wherein the source trigger comprises a square wave signal.

16. The image acquisition unit of claim 15, wherein the first laser and first and second cameras are active during a maximum value of the square wave signal, and the second laser and third and fourth cameras are active during a minimum value of the square wave signal.

17. A system for generating at least one three-dimensional representation of at least one underwater structure, the system comprising:
   an image acquisition unit for obtaining data comprising:
      a unit body;
      a first pair of cameras comprising a first camera and a second camera coupled to the unit body by a first moveable device configured to adjust the first pair of cameras based on the at least one underwater structure;
      a first corresponding laser light fan device having a first illumination setting coupled to the unit body;
      wherein, the first and second cameras configured to capture light during the first illumination setting and generate a first set of data representative of the first laser fan device projecting on the at least one underwater structure at a predetermined scan rate;
   a control unit configured to trigger the first laser at a first predetermined interval corresponding to the first illumination setting; and
   a processing unit configured to receive the data from the first pair of cameras, detect the at least one underwater structure, and construct a profile of the at least one underwater structure.

18. The system of claim 17, further comprising:
   a second pair of cameras comprising a third camera and a fourth camera coupled to the unit body by a second moveable device configured to adjust the second pair of cameras based on the at least one underwater structure and independent from the first pair of cameras; and
   a second corresponding laser light fan device having a second illumination setting different from the first illumination setting;
   wherein the third and fourth cameras are configured to capture light during the second illumination setting and generate a second set of data representative of the second laser projecting on the at least one underwater structure at the predetermined scan rate; and
   the control unit is further configured to trigger the second laser at a second predetermined interval corresponding to the second illumination setting.

19. The system of claim 18, wherein the processing unit is further configured to compile the first set of data and the second set of data into a composite set of data.

20. The system of claim 18, wherein the first and second cameras are mounted at opposite ends of a first side of the unit body, and the third and fourth cameras are mounted at opposite ends of a second side of the unit body.

21. The system of claim 18, wherein the first laser is mounted between the first and second cameras on the first side of the unit body and the second laser is mounted between the third and fourth cameras on the second side of the unit body.

22. The system of claim 17, wherein each pair of cameras and its corresponding laser device are configured to be moved relative one another by remote control.

23. The system of claim 17, wherein at least one pair of cameras comprises cameras which reside in a stereo vision arrangement.

24. The system of claim 17, wherein the first and second illumination settings are mutually exclusive.

25. The system of claim 17, wherein a position of the image acquisition unit is determined in real-time.

26. The system of claim 17, wherein the unit body is a remotely operated vehicle or autonomous underwater vehicle.

27. A method of generating at least one three-dimensional representation of at least one underwater structure comprising the steps of:
   activating a first laser light fan device having a first illumination setting;
   capturing light, at a first pair of cameras moveably mounted to a unit body, during the first illumination setting;
   adjusting the first pair of cameras based on the at least one underwater structure;
   generating a first set of data representative of the first laser projecting on the at least one underwater structure at a predetermined scan rate;
   activating a second laser light fan device having a second illumination setting;
   capturing light, at a second pair of cameras moveably mounted to the unit body, during the second illumination setting;
      adjusting the second pair of cameras, independent from the first pair of cameras, based on the at least one underwater structure;
   generating a second set of data representative of the second laser projecting on the at least one underwater structure at the predetermined scan rate, wherein the first and second illumination settings are mutually exclusive; and
   compiling the first set of data and the second set of data into a composite set of data.

28. The method of claim 27, wherein the compiling of the first set of data and the second set of data occurs substantially simultaneously.

\* \* \* \* \*